(12) United States Patent
Yasuda

(10) Patent No.: US 8,004,774 B2
(45) Date of Patent: *Aug. 23, 2011

(54) LENS APPARATUS AND IMAGE-PICKUP APPARATUS

(75) Inventor: Toshiyuki Yasuda, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/558,322

(22) Filed: Sep. 11, 2009

(65) Prior Publication Data

US 2010/0067122 A1 Mar. 18, 2010

Related U.S. Application Data

(63) Continuation of application No. 11/676,762, filed on Feb. 20, 2007, now Pat. No. 7,595,937.

(30) Foreign Application Priority Data

Feb. 20, 2006 (JP) ................................. 2006-042893

(51) Int. Cl.
*G02B 15/14* (2006.01)
*G02B 7/02* (2006.01)

(52) U.S. Cl. ......... 359/700; 359/819; 359/822; 359/824

(58) Field of Classification Search .......... 359/694–703, 359/819–824; 396/82, 84
See application file for complete search history.

(56) References Cited

U.S. PATENT DOCUMENTS 7,595,937 B2 * 9/2009 Yasuda ........................ 359/700

FOREIGN PATENT DOCUMENTS

| JP | 2002-277716 A | 9/2002 |
| JP | 2004-109709 A | 4/2004 |

* cited by examiner

*Primary Examiner* — Mohammed Hasan
(74) *Attorney, Agent, or Firm* — Canon USA, Inc. IP Division

(57) ABSTRACT

A lens apparatus which has a small size but allows a higher magnification and an image-pickup apparatus including the lens apparatus are disclosed. The lens apparatus provides a variable magnification by moving a first lens and a second lens placed closer to an image plane than the first lens in the direction of an optical axis. The lens apparatus includes a first driving member which is rotated around the optical axis to move the first lens in the optical axis direction, a second driving member which moves the second lens by itself in the optical axis direction, and a driving mechanism which at least drives the rotation of the first driving member. The second driving member is moved in the optical axis direction relative to the first driving member by the rotation of the first driving member.

10 Claims, 10 Drawing Sheets

LENS APPARATUS AND IMAGE-PICKUP APPARATUS

CROSS-REFERENCE TO RELATED APPLICATIONS

This application is a continuation of U.S. patent application Ser. No. 11/676,762 Now U.S. Pat. No. 7,595,937 B2 filed Feb. 20, 2007, which claims priority from Japanese Patent Application No. 2006-042893 filed Feb. 20, 2006, the entire contents of both of which are hereby incorporated by reference herein.

BACKGROUND OF THE INVENTION

The present invention relates to a lens apparatus of a so-called collapsible type which is mounted on an image-pickup apparatus such as a digital still camera.

A lens apparatus of the collapsible type having a zooming ratio of 2 to 3 typically employs a two-stage telescopic structure in which a so-called moving cam ring and a first barrel for holding a first lens closest to an object are moved in the direction of an optical axis relative to a fixed barrel which is secured to a camera body. For example, Japanese Patent Laid-Open No. 2001-324663 has disclosed a structure in which a moving cam ring is driven along a cam groove portion formed in a fixed barrel, and a first barrel (first lens) and a second barrel (second lens) serving as a variator and placed on the image plane side of the first barrel are driven along a cam groove portion formed in the moving cam ring.

The moving ranges of the first barrel and second barrel in the lens apparatus arranged as described above depend on the lengths of the fixed barrel and the moving cam ring. As the zooming ratio is higher, the moving ranges of the first barrel and second barrel need to be wider.

In recent years, cameras require not only a reduced size but also an increased magnification. However, it is difficult to increase the moving ranges of the first barrel and second barrel by means of the moving cam ring which has the limited length in the optical axis direction in the abovementioned two-stage telescopic structure.

To address this, some proposals have been made of cameras provided with lens apparatuses of a three-stage telescopic structure. For example, Japanese Patent Laid-Open No. 2004-085932 has disclosed a lens apparatus of such a three-stage telescopic structure in which a second barrel switches between two cam groove portions formed in a moving cam ring to realize a wider moving range of the second barrel.

Japanese Patent Laid-Open No. 2004-325555 has disclosed a lens apparatus of the two-stage telescopic structure which is intended to widen the moving range of a lens. In the lens apparatus, a motor is placed on a second barrel and the rotation force of the motor is transmitted to a lead screw via a gear train. The lead screw engages with a nut placed on a third barrel disposed closer to an image plane than the second barrel. The lead screw is rotated to move the third barrel in the direction of an optical axis relative to the second barrel which is movable in the optical axis direction, thereby widening the moving range of the third barrel.

In the lens apparatus disclosed in Japanese Patent Laid-Open No. 2004-085932, some play is intentionally provided between three cam followers formed on the second barrel and the associated three cam groove portions in order to achieve smooth switch of the second barrel between the cam grooves. The play is likely to cause large decentering of the second barrel depending on the posture of the camera.

To reduce the decentering, it is possible to use an alignment mechanism for biasing the second barrel toward one side in the diameter direction by a movable cam follower provided with a spring. However, when the alignment mechanism is provided and the barrel switches between the cam groove portions, some problems easily occur such as unsmooth telescopic operation since the movable cam follower gets snagged when it comes off one cam groove portion and then is engaged with the other cam groove portion.

The structure disclosed in Japanese Patent Laid-Open No. 2004-325555 is effective in widening the moving range of the third barrel as a focus lens. However, the structure is not provided for widening the moving range of the second barrel as a variator, that is, for realizing a higher magnification.

BRIEF SUMMARY OF THE INVENTION

The present invention provides a lens apparatus which has a small size but allows a higher magnification, and an image-pickup apparatus including the lens apparatus.

According to an aspect, the present invention provides a lens apparatus which realizes a variable magnification by moving a first lens and a second lens placed closer to an image plane than the first lens in the direction of an optical axis. The lens apparatus includes a first driving member which is rotated around the optical axis to move the first lens in the optical axis direction, a second driving member which moves the second lens by itself in the optical axis direction, and a driving mechanism which at least drives the rotation of the first driving member. The second driving member is moved in the optical axis direction relative to the first driving member by the rotation of the first driving member.

According to another aspect, the present invention provides a lens apparatus which is changed between a wide-angle state and a telephoto state by moving a first lens and a second lens placed closer to the image plane than the first lens in the direction of an optical axis. The lens apparatus includes a first driving member which is rotated around the optical axis to move a first holding member which holds the first lens in the optical axis direction, and a second driving member which is rotated around the optical axis to move a second holding member which holds the second lens in the optical axis direction. The rotation of the first driving member around the optical axis rotates the second driving member around the optical axis, and the first lens is separated from the second lens in the wide-angle state more widely than in the telephoto state.

According to another aspect, the present invention provides a lens apparatus which is changed between a retracted state and an image picking-up state by moving a first lens and a second lens placed closer to an image plane than the first lens in the direction of an optical axis. The lens apparatus includes a first driving member which is rotated around the optical axis to move a first holding member which holds the first lens in the optical axis direction, and a second driving member which is rotated around the optical axis to move a second holding member which holds the second lens in the optical axis direction. The rotation of the first driving member around the optical axis rotates the second driving member around the optical axis, and the rotation of the first driving member around the optical axis rotates the second driving member around the optical axis, and an overlap amount between the first and second driving members in the direction orthogonal to the optical axis in the image picking-up state is smaller than that in the retracted state.

According to another aspect, the present invention provides an image-pickup apparatus including the abovementioned lens apparatus.

Other objects and features of the present invention will be apparent from the following description of a preferred embodiment with reference to the accompanying drawings.

DETAILED DESCRIPTION OF THE PREFERRED EMBODIMENTS

Preferred embodiments of the present invention will hereinafter be described with reference to the drawings.

Embodiment 1

Figure 12:
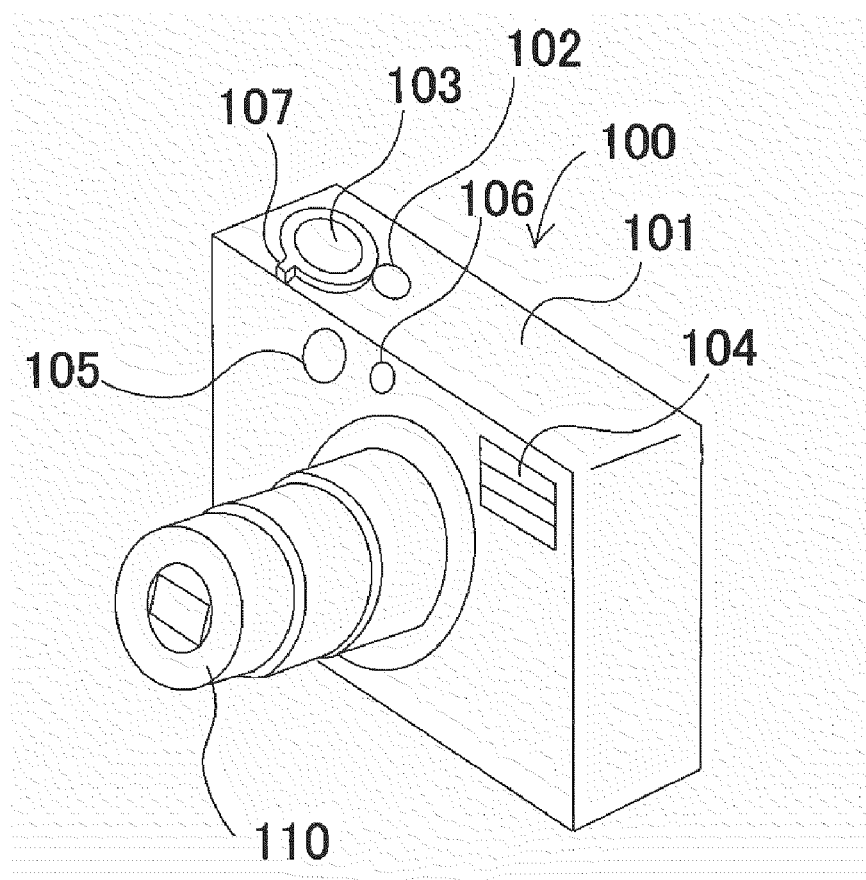
FIG. 12 shows the outer appearance of a camera including the lens barrel of Embodiments 1 and 2.

First, FIG. 12 shows the outer appearance of a digital still camera serving as an image-pickup apparatus provided with a three-stage collapsible (telescopic) lens barrel (lens apparatus) which is Embodiment 1 of the present invention. In this case, a collapsed state refers to the state in which the lens barrel portion is retracted in the image-pickup apparatus. However, the retracted state means not only the state in which the whole lens barrel is housed in the image-pickup apparatus but also the state in which part of the lens barrel protrudes from the image-pickup apparatus and the remainder of the lens barrel is retracted.

In FIG. 12, reference numeral 100 shows a camera, 101 a camera body, and 102 a main switch of the camera to switch between power-on and power-off. Reference numeral 103 shows an image-pickup switch. When the image-pickup switch 103 is half pressed, preparatory operations for image pickup are performed such as photometric operation, auto focus operation (AF) and the like. When the switch 103 is fully pressed, an image is picked up and the picked up image is recorded.

Reference numeral 104 shows a flashing portion, 105 a window of a viewfinder, and 106 a light-receiving window for photometric operation. Reference numeral 110 shows a lens barrel of a three-stage collapsible type.

Reference numeral 107 shows a zoom lever which can be turned to drive zooming of the lens barrel 110. Although not shown in FIG. 12, an image-pickup element is mounted in the camera body 101, such as a CCD sensor and a CMOS sensor which photoelectrically converts an object image formed by an image-pickup optical system in the lens barrel 110.

Figure 1:
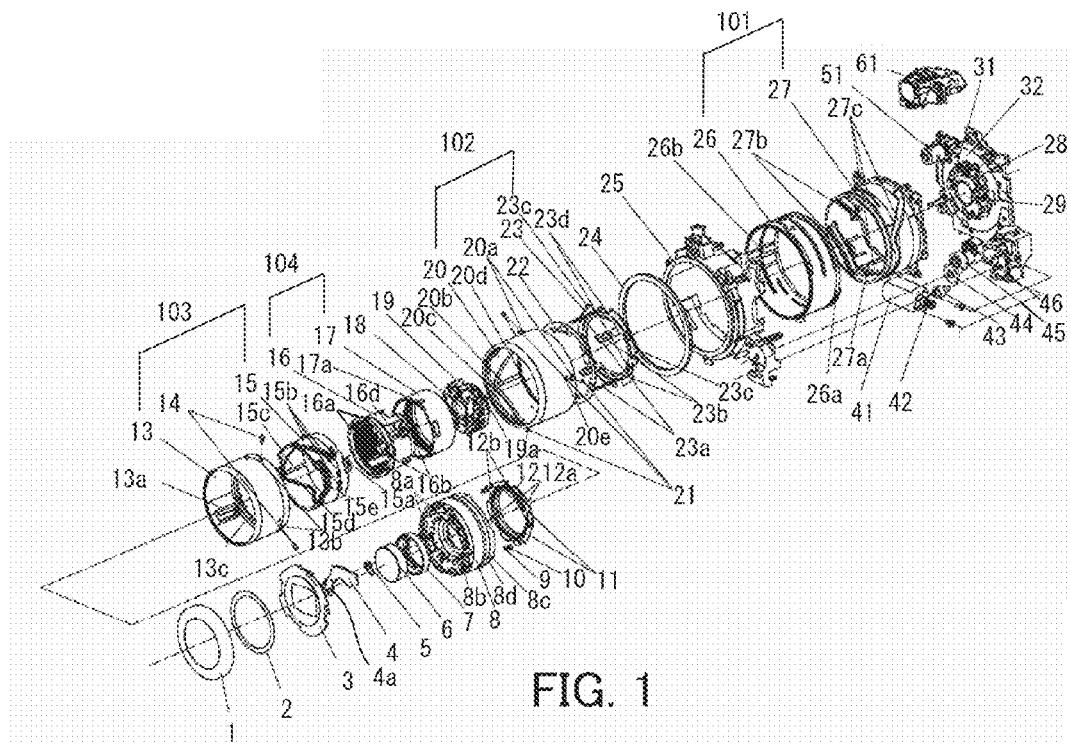
FIG. 1 is an exploded perspective view showing a lens barrel which is Embodiment 1 of the present invention.
Figure 2A:
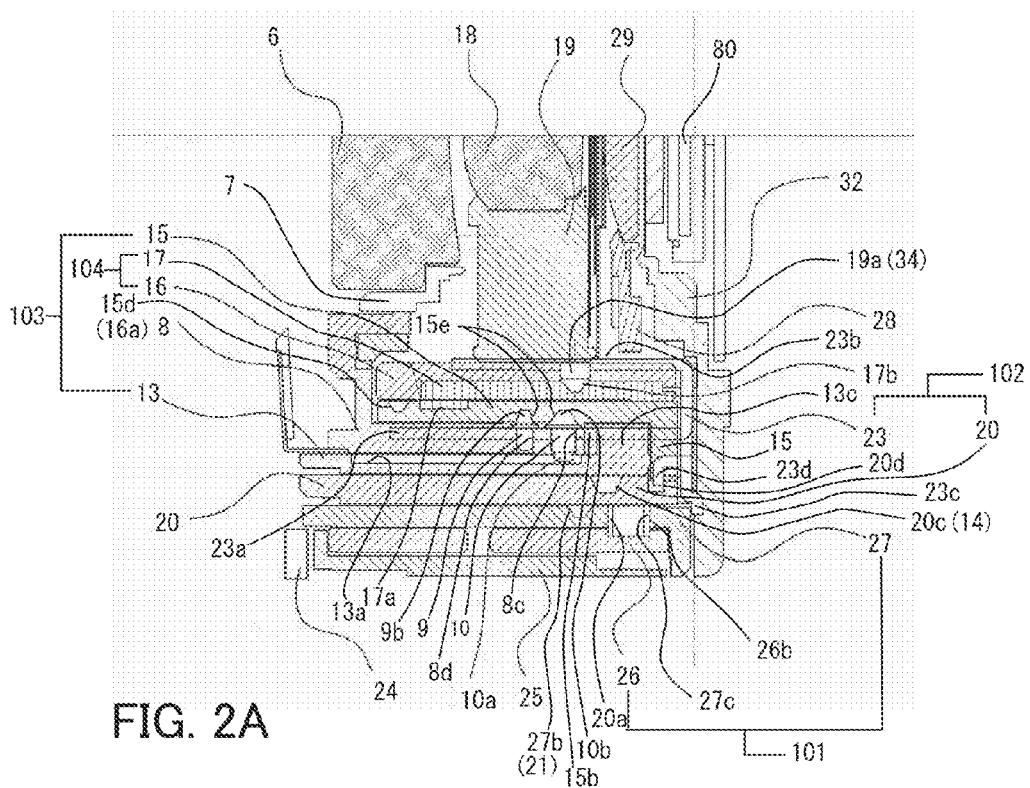
FIG. 2A is a section view showing the lens barrel of Embodiment 1 in a collapsed state.
Figure 2B:
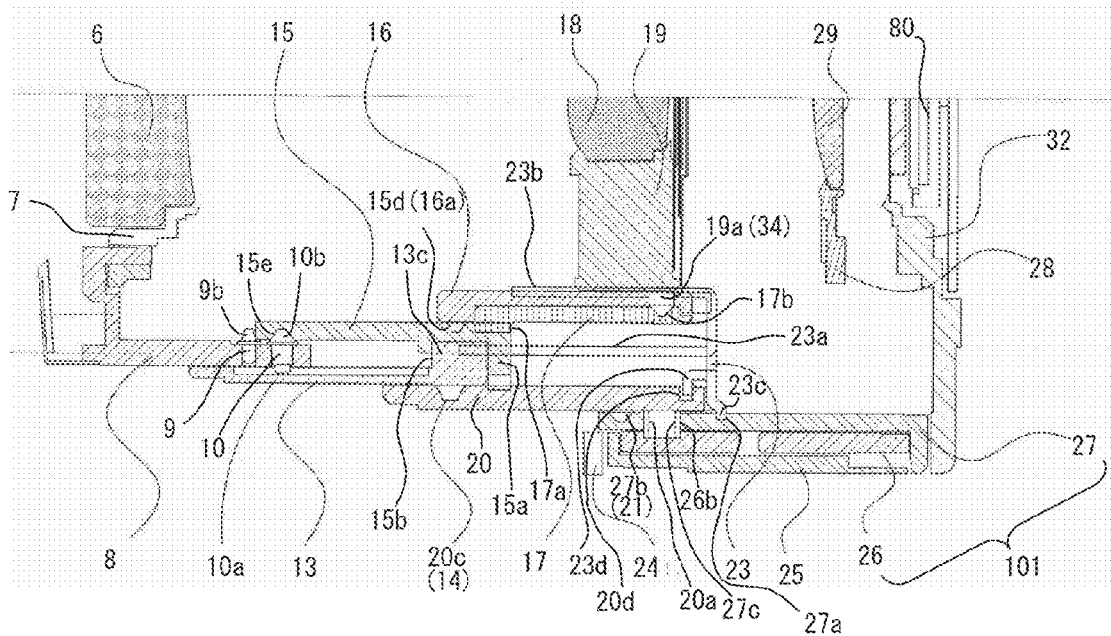
FIG. 2B is a section view showing the lens barrel of Embodiment 1 for a wide-angle state.
Figure 2C:
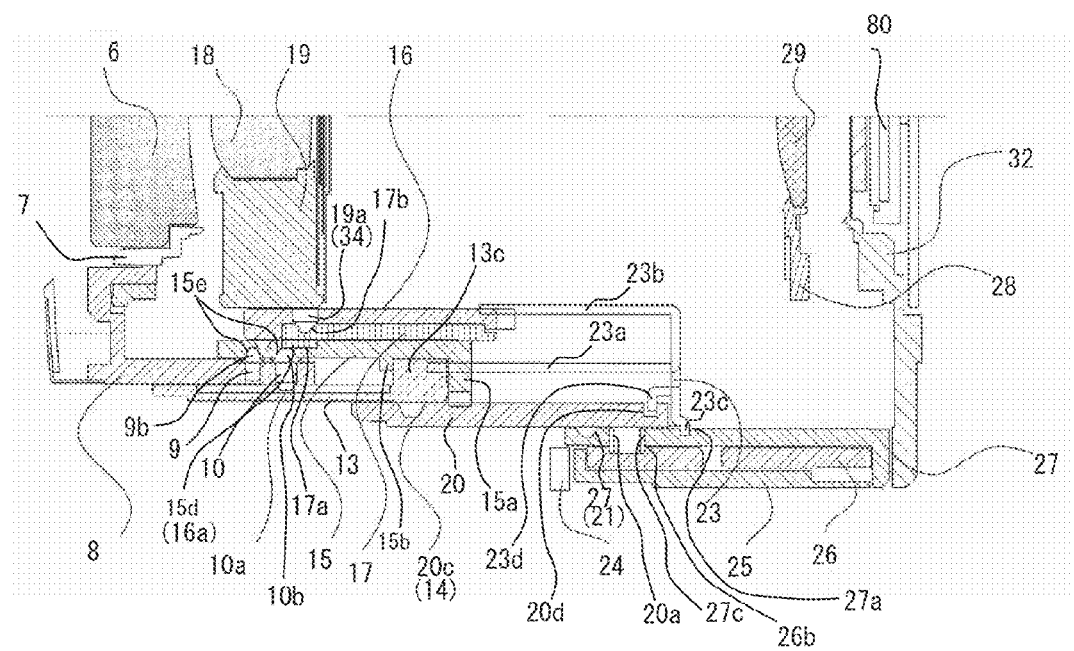
FIG. 2C is a section view showing the lens barrel of Embodiment 1 for a telephoto state.

Next, the structure of the abovementioned lens barrel will be described. FIG. 1 is an exploded perspective view showing the structure of the lens barrel. FIGS. 2A to 2C schematically show the section of the lens barrel. FIG. 2A shows the collapsed state, FIG. 2B shows a wide-angle state in a variable-magnification range of an image picking-up state in which images can be picked up, and FIG. 2C shows a telephoto state in the variable-magnification range of the image picking-up state.

In FIGS. 1 and 2A to 2C, reference numeral 32 shows a base member of the lens barrel. The base member 32 forms the body of the lens barrel together with a fixed barrel 27 secured to a front end portion of the base member 32 by screws. The base member 32 holds an image-pickup element 80 as described above. The base member 32 holds a focus motor 51 and a third barrel 28 which is moved by the focus motor 51 in the direction of an optical axis. A third lens unit 29 serving as a focus lens is held on the third barrel 28.

A driving ring 26 is placed on the outer circumference of the fixed barrel 27. Gear teeth 26a are formed on the outer circumference of the driving ring 26. Output from a zoom motor 41 is transmitted to the gear teeth 26a after deceleration through a train of gears 42 to 46.

Figure 9A:
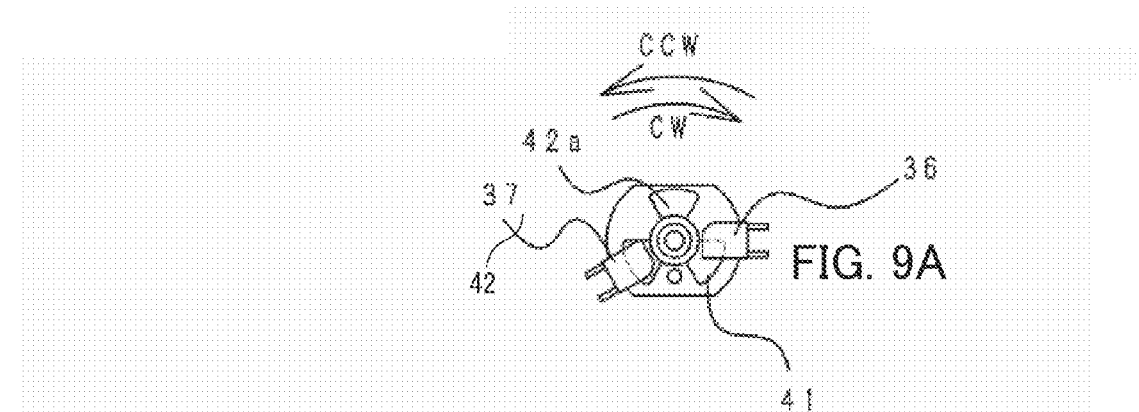
FIG. 9A shows a rotation detecting mechanism for a zoom motor in Embodiment 1.
Figure 9B:
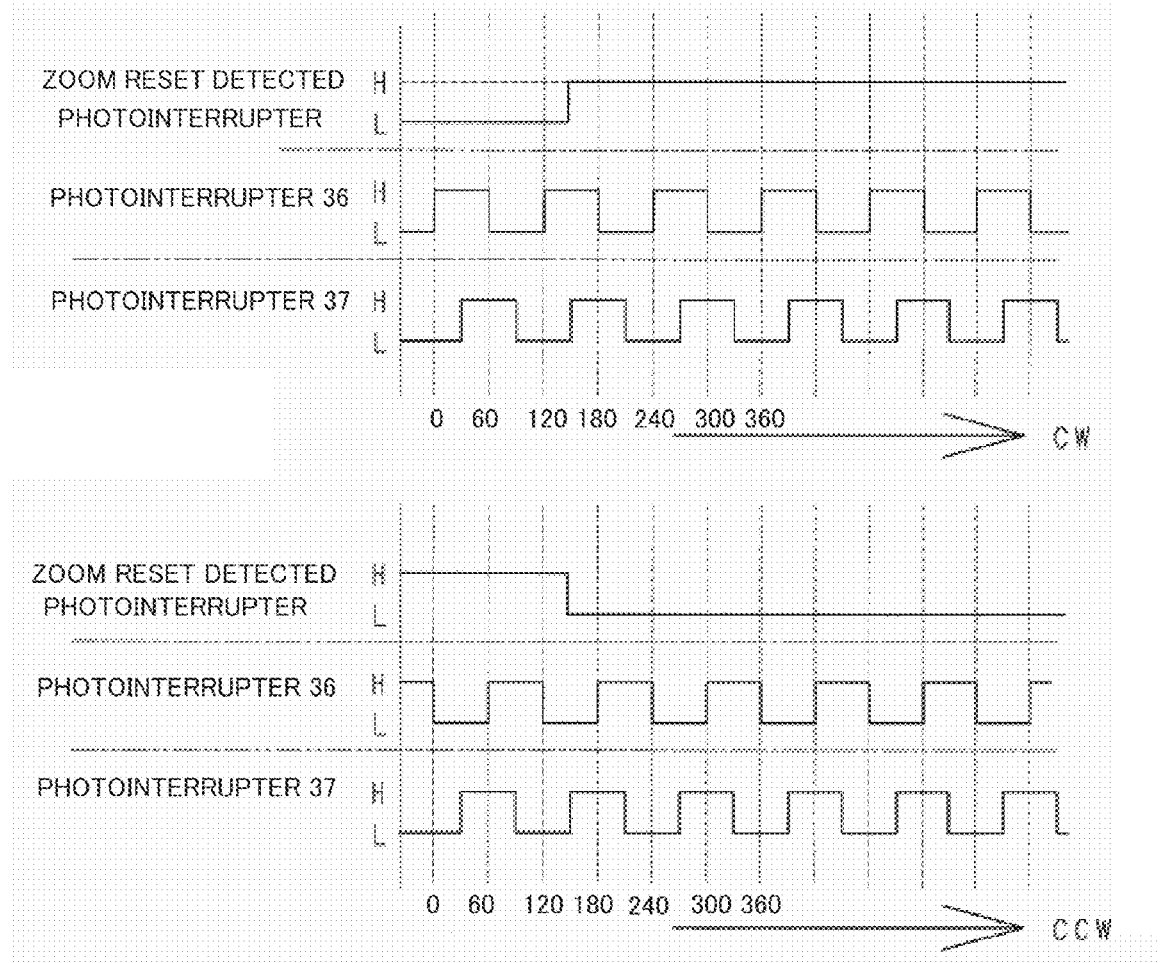
FIG. 9B shows output from the rotation detecting mechanism in FIG. 9A.

As shown in FIG. 9A, the gear 42 is provided with three light-shield propellers 42a. The rotation of the propellers 42a (light shield and light reception) is detected by two photointerrupters 36 and 37. When the propellers 42a are rotated in a clockwise direction (CW) and a counterclockwise direction (CCW), the photointerrupters 36 and 37 output signals having waveforms as shown in FIG. 9B. The difference between the waveforms can be used to detect the direction of the rotation of the zoom motor 41.

In addition, the wave number can be counted to detect the position of the lens barrel during telescopic movement.

In FIGS. 1 and 2A to 2C, reference numeral 25 shows a barrel cover which serves to cover the train of zoom gears 42 to 46 and the driving ring 26. The barrel cover 25 also serves as a base plate to which a viewfinder unit 61 is attached.

A cam groove portion 27b is formed in an inner circumferential surface of the fixed barrel 27, and a penetrating groove portion 27c having the same cam profile as that of the cam groove portion 27b is formed. A metallic follower pin 21 is pressed into a hole 20e formed in the outer circumferential surface of a second moving cam ring 20 and is engaged with the cam groove portion 27b. A protrusion 20a formed on the outer circumference of the second moving cam ring 20 is extended through the penetrating groove portion 27c.

The end portion of the protrusion 20a of the second moving cam ring 20 is engaged with a key groove portion 26b formed in the inner circumferential surface of the driving ring 26. When the driving ring 26 is rotated, the second moving cam ring 20 is rotated along the cam groove portion 27b of the fixed barrel 27 and moved in the optical axis direction at the same time. The driving ring and the fixed barrel 27 serve as a first to-and-fro mechanism (driving mechanism) 101. The first to-and-fro mechanism 101 may be realized by forming a female helicoid in the fixed barrel 27 and a male helicoid in the driving ring 26 to rotate and move the driving ring 26 in the optical axis direction.

Reference numeral 23 shows a straight guide key which has an annular portion and straight key portions 23a, 23b extending in the optical axis direction from the annular portion. Three bent portions 23d having different shapes are provided at irregular intervals at three points in the circumferential direction on the periphery of the annular portion. These bent portions 23d are engaged with a groove portion 20d formed so as to extend in the circumferential direction on the inner circumferential surface of the second moving cam ring 20.

Three convex portions 23c are formed at regular intervals of 120 degrees at three points in the circumferential direction on the outer periphery of the annular portion. These convex portions 23c are engaged with a key groove portion 27a formed so as to extend in the optical axis direction on the inner circumferential surface of the fixed barrel 27. Thus, the straight guide key 23 is not rotated when the second moving cam ring 20 is rotated, and is guided along the key groove portion 27a of the fixed barrel 27 to be moved in the optical axis direction.

Reference numeral 22 shows a light-shielding sheet which is attached to the annular portion of the straight guide key 23. The light-shielding sheet 22 blocks outside light entering through spacing between respective stages of the lens barrel.

Reference numeral 13 shows a first straight advancing barrel which guides a first barrel 8 in the optical axis direction. The first barrel 8 holds a first lens holder 7 for holding a first lens unit 6. Holes 8c and 8d are formed at regular intervals of 120 degrees in the circumferential direction on the side face of the first barrel 8.

A follower pin 10 and a sub follower pin 9 having tapered portions 10b and 9b are pressed into the holes 8c and 8d, respectively, from the inner circumference side. The shaft portion of the follower pin 10 is longer than the wall thickness of the first barrel 8, and after the follower pin 10 is pressed thereinto, a convex portion 10a protrudes from the outer circumferential surface of the first barrel 8. The convex portion 10a is engaged with a key groove portion 13a formed in the inner circumferential surface of the first straight advancing barrel 13. Thus, the first barrel 8 is guided to move straight in the optical axis direction relative to the first straight advancing barrel 13.

As shown in FIG. 1, a groove portion extending in parallel with and adjacent to the key groove portion 13a is formed in the first straight advancing barrel 13. The groove portion has a width larger than the circumferential direction width of the key groove portion 13a, and is used as the groove portion for pressing the follower pin 10 into the first barrel 8 or the like.

A lens barrier is provided on the front surface of the first barrel 8, the surface which is closer to the object, for protecting a lens surface which is not ready for image pickup when the lens barrel is retracted (collapsed). A shaft portion 8a provided on the first barrel 8 is inserted into a hole formed at the center of a protrusion 4a formed at the back of a barrier blade 4 to allow rotation of the barrier blade 4 in an open and close direction. It should be noted that a barrier blade (not shown) having an identical shape as that of the barrier blade 4 shown in FIG. 1 is placed rotationally symmetrically with the barrier blade 4 with respect to the optical axis.

Reference numeral 15 shows a first moving cam ring (first driving member). Protrusions 15b are formed at irregular intervals in the circumferential direction on the outer circumference of the first moving cam ring 15. A protrusion 15a is formed at the image plane side end of the first moving cam ring 15 at a position shifted from the protrusions 15b in the circumferential direction. A rib 13c formed on the inner circumferential surface of the first straight advancing barrel 13 is inserted between these protrusions 15a and 15b.

Figure 4:
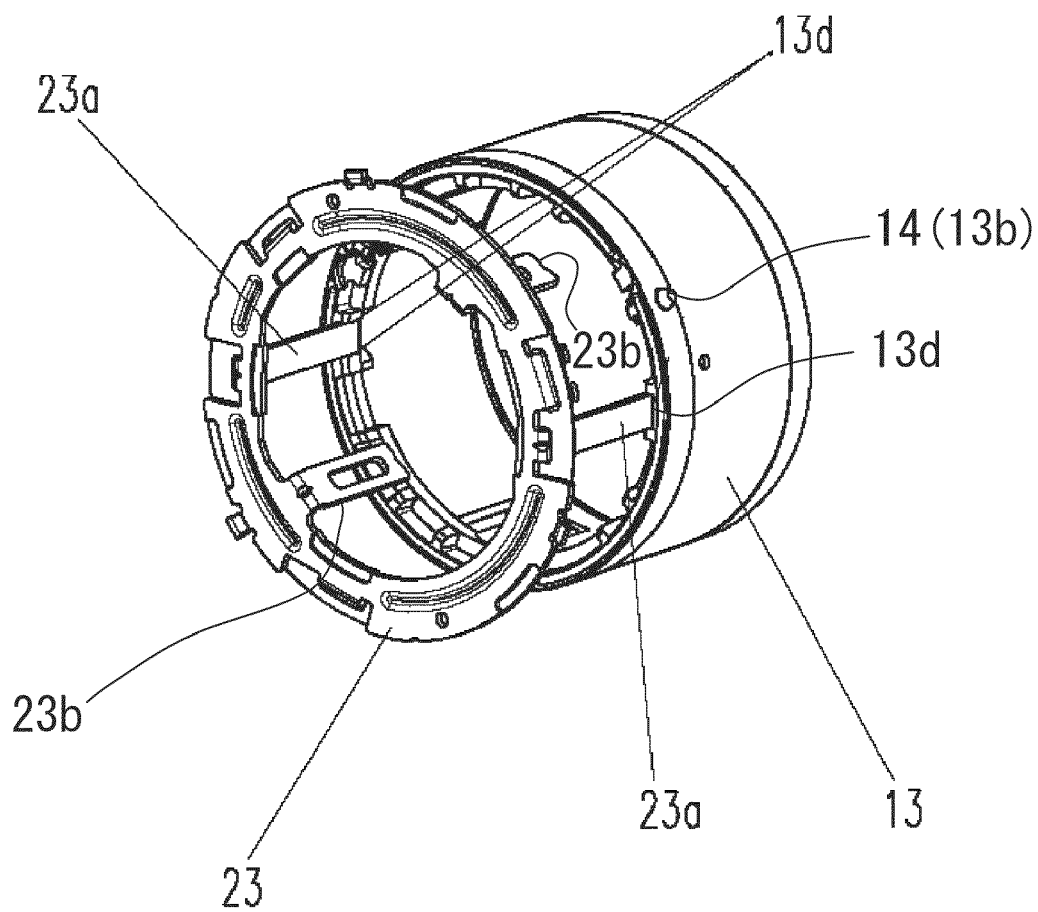
FIG. 4 is a perspective view showing a straight guide key and a first straight advancing barrel which form part of the lens barrel of Embodiment 1.

As shown in FIG. 4, notches 13d are formed in the rib 13c at the same angular positions as those of the protrusions 15b. This allows the first moving cam ring 15 to be put into the first straight advancing barrel 13 from behind (from the image plane side). Since the protrusions 15b are formed at irregular intervals, the first straight advancing barrel 13 and the first moving cam ring 15 can be relatively rotated at angular positions other than the angular position at which the ring 15 is mounted to the barrel 13, and they can be moved together in the optical axis direction.

The end of the protrusion 15a of the first moving cam ring 15 is engaged with a key groove portion 20b formed in the inner circumferential surface of the second moving cam ring 20, thereby transmitting the rotation force of the second moving cam ring 20 to the first moving cam ring 15.

As shown in FIG. 4, some of the notches 13d of the first straight advancing barrel 13 are engaged with the key portions 23a of the straight guide key 23 in the width direction (circumferential direction). Thus, the first straight advancing barrel 13 is guided in the optical axis direction.

Three holes 13b are formed at three portions at regular intervals in the circumferential direction in the outer circumferential surface of the first straight advancing barrel 13. A follower pin 14 is pressed into each hole 13b. The follower pin 14 is engaged with a cam groove portion 20c formed in the inner circumferential surface of the second moving cam ring 20. With this structure, as the second moving cam ring 20 is rotated, the first straight advancing barrel 13 is driven along the cam groove portion 20c in the optical axis direction. The second moving cam ring 20 and the straight guide key 23 serve as a second to-and-fro mechanism (driving mechanism) 102.

Cam groove portions 15e and 15d are formed in the outer and inner circumferential surfaces of the first moving cam ring 15, respectively. The tapered portions 10b, 9b of the follower pin 10 and the sub follower pin 9 pressed into the first barrel 8 are engaged with the cam groove portion (first cam portion) 15e in the outer circumferential surface. Thus, the first barrel 8 is driven in the optical axis direction along the cam groove portion 15e when the first moving cam ring 15 is rotated. The first moving cam ring 15 and the first straight advancing barrel 13 serve as a third to-and-fro mechanism 103.

In this structure, the driving force transmitted from the driving ring 26 then passes through the first to-and-fro mechanism 101 to the third to-and-fro mechanism 103 to move forward and rearward the first barrel 8 which holds the first lens unit 6.

Figure 5:
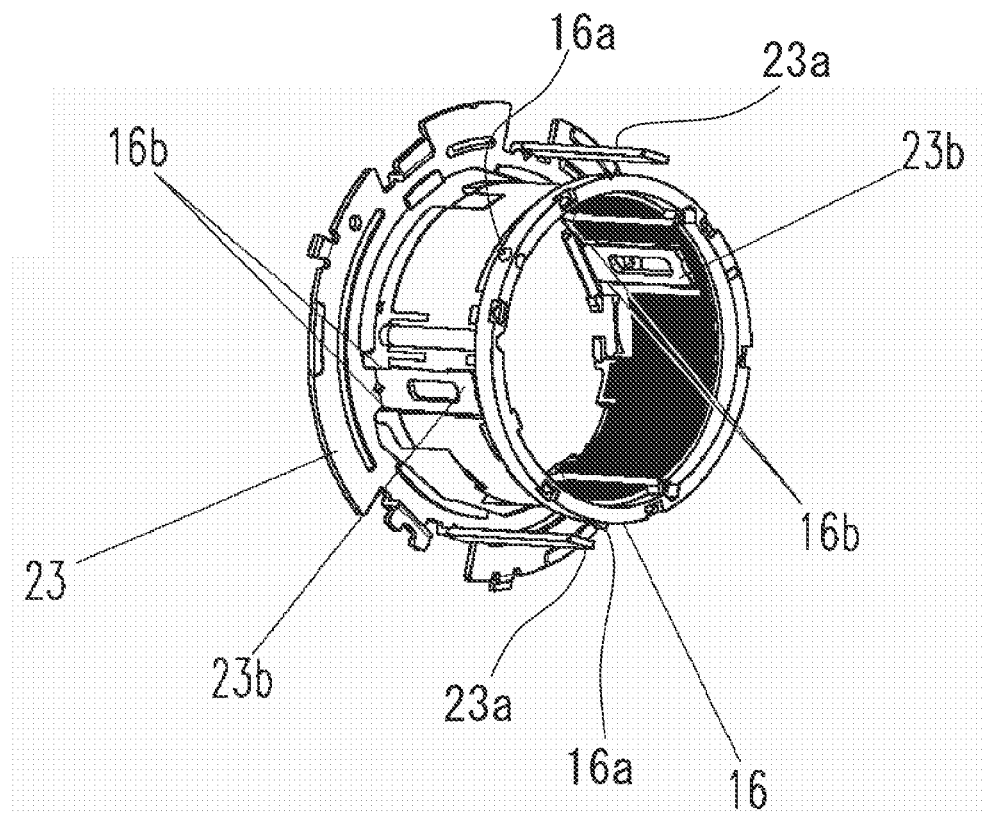
FIG. 5 is a perspective view showing the straight guide key and a second straight advancing barrel which form part of the lens barrel of Embodiment 1.
Figure 6:
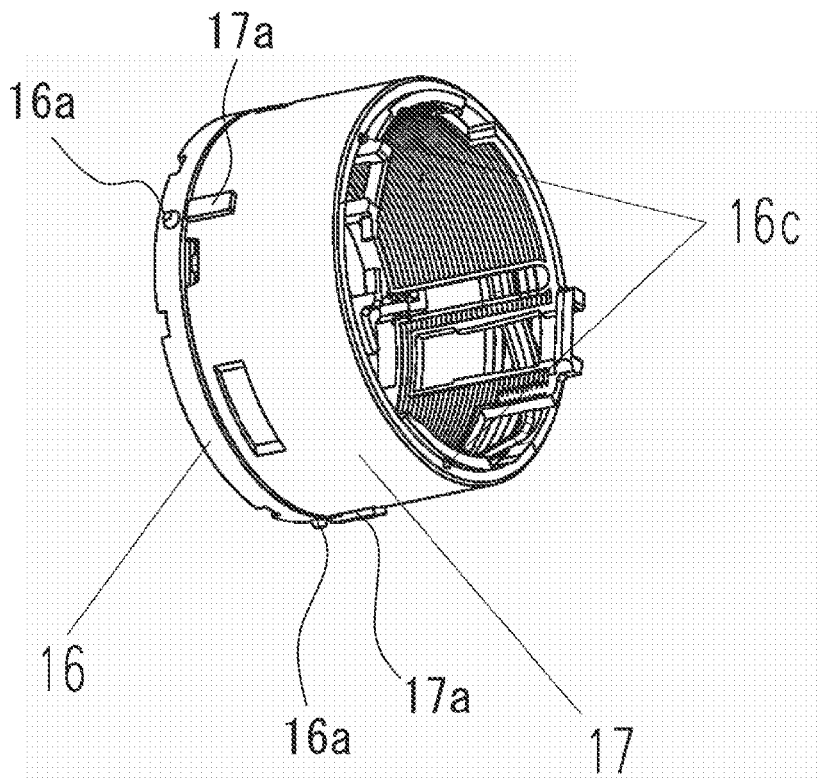
FIG. 6 is a perspective view showing a second straight advancing barrel and a third moving cam ring which form part of the lens barrel of Embodiment 1.

A cam follower portion 16a formed on the outer circumferential surface of the second straight advancing barrel 16 is engaged with a cam groove portion (second cam portion) 15d in the inner circumferential surface of the first moving cam ring 15 as shown in FIGS. 5 and 6. A third moving cam ring (second driving member) 17 is placed on the outer circumference of the second straight advancing barrel 16. The third moving cam ring 17 is rotatable around the optical axis relative to the second straight advancing barrel 16.

Figures 7A, 7B:
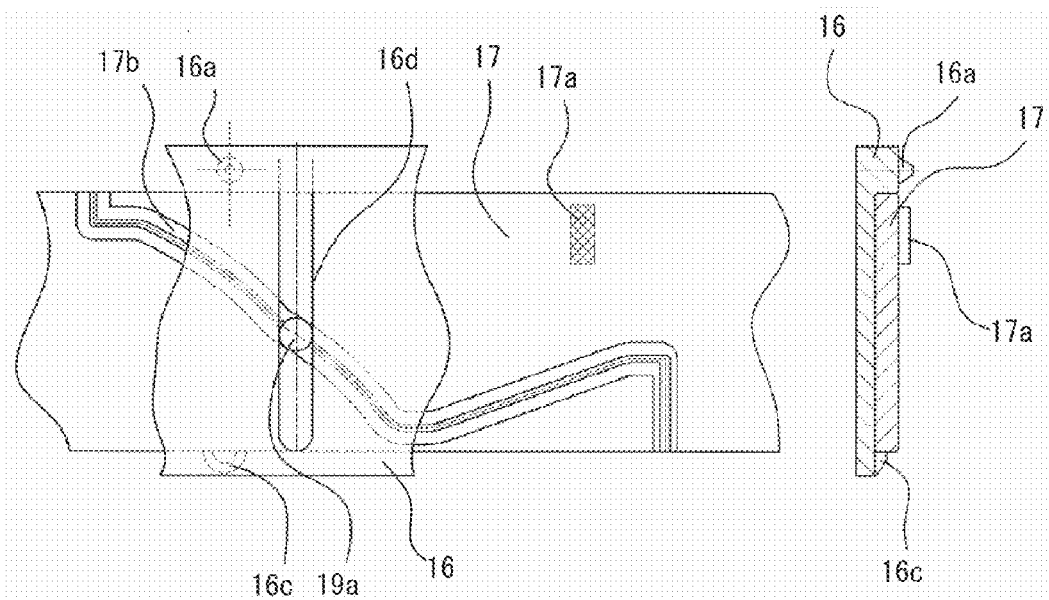
FIG. 7A is a developed view showing the second straight advancing barrel and the third moving cam ring in Embodiment 1.
FIG. 7B is a section view showing the second straight advancing barrel and the third moving cam ring in Embodiment 1.

As shown in FIGS. 6, 7A and 7B, the third moving cam ring 17 is placed between three protrusions 16c provided at the image plane side end of the second straight advancing barrel 16 and a rib provided at the object side end of the second straight advancing barrel 16. This causes the third moving cam ring 17 and the second straight advancing barrel 16 to be moved together in the optical axis direction.

A protrusion 17a is provided on the outer circumferential surface of the third moving cam ring 17. The protrusion 17a engages with a key groove portion 15c formed so as to extend in the optical axis direction in the inner circumferential surface of the first moving cam ring 15. Thus, the rotation force of the first moving cam ring 15 is also transmitted to the third moving cam ring 17. Specifically, the rotation force transmitted from the driving ring 26 to the second moving cam ring 20 is then transmitted to and rotates the first moving cam ring 15 and is also transmitted to and rotates the third moving cam ring 17 via the first moving cam ring 15.

A straight guide key hole 16b is formed in the second straight advancing barrel 16. As shown in FIG. 5, the key portion 23b of the straight guide key 23 is engaged with the key hole potion 16b. This allows the second straight advancing barrel 16 to be guided in the optical axis direction.

Therefore, as the first moving cam ring 15 is rotated, the second straight advancing barrel 16 is moved in the optical axis direction along the cam groove portion 15d formed in the inner circumferential surface of the first moving cam ring 15. The third moving cam ring 17 is rotated around the optical axis while moving in the optical axis direction together with the second straight advancing barrel 16.

Reference numeral 19 shows a second barrel which holds a mechanism for driving a second lens unit 18 serving as a variator, aperture blades for adjusting the amount of light, not shown, and shutter blades, not shown. In the image-pickup optical system, the second lens unit 18 is placed next to the first lens unit which is closest to the object side.

Figure 3:
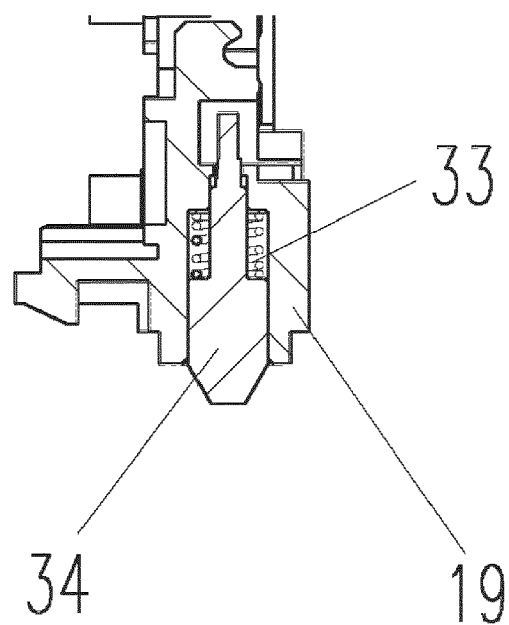
FIG. 3 is a section view showing a movable cam follower mechanism provided for a second barrel in the lens barrel of Embodiment 1.

The second barrel 19 is provided on the outer circumferential surface with two fixed cam followers 19a having tapered portions at their ends and a movable cam follower 34 biased outward in the diameter direction of the barrel by a compression spring 33 as shown in FIG. 3 at regular intervals. The fixed cam followers 19a and the movable cam follower 34 are engaged with a cam groove portion 17b formed in the inner circumferential surface of the third moving cam ring 17. These cam followers 19a and 34 are also engaged with the straight guide groove portion 16d formed so as to extend in the optical axis direction in the second straight advancing barrel 16.

FIG. 7A schematically shows the third moving cam ring 17 and the second straight advancing barrel 16 in a developed view in the circumferential direction. The third moving cam ring 17 is rotated in a lateral direction in FIG. 7A. The rotation of the third moving cam ring 17 moves the second barrel 19 in the optical axis direction since the fixed followers 19a (and the movable cam follower 34) are engaged with the cam groove portion 17b. Then, the second barrel 19 is guided straight along the straight guide groove portion 16d in the second straight advancing barrel 16.

In this manner, the second barrel 19 is driven in the optical axis direction by a fourth to-and-fro mechanism 104 formed of the second straight advancing barrel 16 and the third moving cam ring 17.

As described above, in Embodiment 1, the fourth to-and-fro mechanism 104 for driving the second barrel 19 in the optical axis direction is provided in the middle of a series of the first to third to-and-fro mechanisms 101 to 103 for driving the first barrel 8 in the optical axis direction.

Figure 8A:
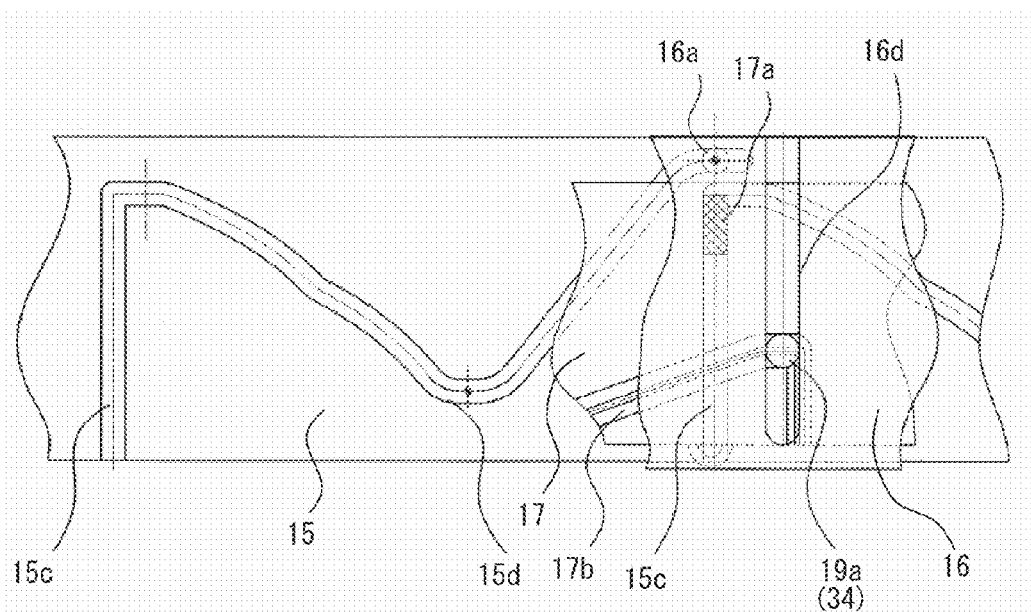
FIG. 8A is a developed view showing the relationship between cams in the collapsed state in Embodiment 1.
Figure 8B:
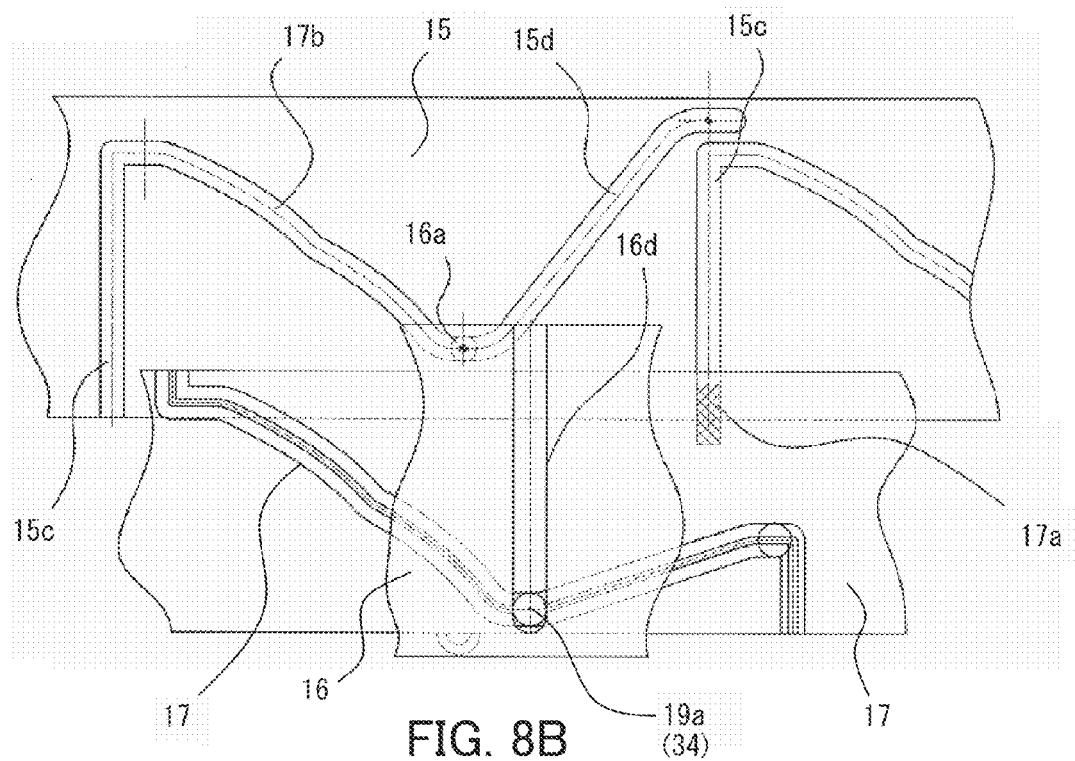
FIG. 8B is a developed view showing the relationship between the cams for the wide-angle state in Embodiment 1.
Figure 8C:
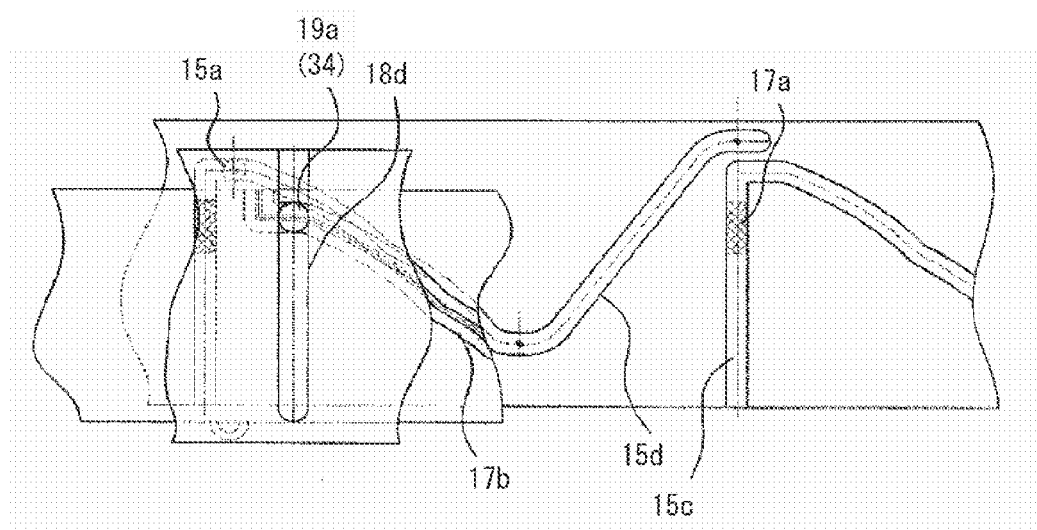
FIG. 8C is a developed view showing the relationship between the cams in the telephoto state in Embodiment 1.

FIGS. 8A, 8B, and 8C show the inner surfaces of the first moving cam ring 15, the second straight advancing barrel 16, and the third moving cam ring 17 in developed views in the circumferential direction.

FIG. 8A shows the state in which the power for the camera is turned off and the lens barrel is collapsed (retracted) from the state in which images can be picked up. When the main switch 102 is operated in this state to power the camera on, the zoom motor 41 is energized.

The rotation force of the zoom motor 41 is transmitted to the driving ring 26 via the train of zoom gears 42 to 46 and also transmitted to the second moving cam ring 20 and the first moving cam ring 15. The transmitted rotation force moves the first moving cam ring 15 rightward in FIG. 8A. The cam follower portion 16a of the second straight advancing barrel 16 is engaged with the cam groove portion 15d formed in the first moving cam ring 15, and the second straight advancing barrel 16 is guided straight in the optical axis direction by the straight guide key 23. Thus, the second straight advancing barrel is moved downward in FIG. 8A along the cam groove portion 15d.

Since the driving key 17a formed on the outer circumference of the third moving cam ring 17 is engaged with the key groove portion 15c of the first moving cam ring 15, the rotation force of the first moving cam ring 15 is transmitted to the third moving cam ring 17. The third moving cam ring 17 is moved in the optical axis direction together with the second straight advancing barrel 16 while rotating.

The fixed cam followers 19a provided for the second barrel 19 and the movable cam follower 34 biased outward in the diameter direction of the barrel as described above are engaged with the cam groove portion 17b formed in the third moving cam ring 17 and also engaged with the straight guide groove portion 16d of the second straight advancing barrel 16. Thereby, the second barrel 19 is driven in the rotation direction along the cam groove portion 17b of the third moving cam ring 17 while being guided straight in the optical axis direction.

In this manner, the state is changed to the wide-angle state shown in FIGS. 8B and 2B and the camera is ready for image pickup.

Next, when the zoom lever 107 is operated in the telephoto direction, the zoom motor 41 is energized for rotation in the telephoto direction. The rotation force from the zoom motor 41 is transmitted to the driving ring via the train of zoom gears 42 to 46 and then transmitted to the second moving cam ring 20, the first moving cam ring 15, and the third moving cam ring 17. The cam groove portions 15d and 17b formed in the first moving cam ring 15 and the third moving cam ring 17, respectively, have non-linear shapes and achieve precise position control of the second straight advancing barrel 16 for providing the best optical characteristics during zooming.

In this manner, the first barrel 8 and the second barrel 19 are driven in the optical axis direction to change the zoom state to the telephoto state shown in FIG. 8C.

The moving amount of the second barrel 19 in the optical axis direction in the change between the wide-angle state and the telephoto state of the image picking-up state corresponds to the sum of the lift amount of the cam groove portion 15d in the first moving cam ring 15 and the lift amount of the cam groove portion 17b in the third moving cam ring 17. Specifically, as shown in FIG. 2B, in the wide-angle state, the third moving cam ring 17 can be moved widely toward the image plane relative to the first moving cam ring 15, and correspondingly, the second barrel 19 can be separated sufficiently from the first barrel 8 toward the image plane.

The cam groove portions 15d and 17b are formed such that an overlap amount (or overlap degree) between the first moving cam ring 15 and the third moving cam ring 17 in the direction orthogonal to the optical axis in this wide-angle state is smaller than those in the retracted state and the telephoto state. This applies to Embodiment 2 later described.

As shown in FIG. 2C, in the telephoto state, the third moving cam ring 17 is moved to the position where the first moving cam ring 15 surrounds the third moving cam ring 17 (the first moving cam ring 15 is generally overlapped with the third moving cam ring 17), and thereby the second barrel 19 can be disposed close to the first barrel 8. The cam groove portions 15d and 17d are formed such that an overlap amount between the first moving cam ring 15 and the third moving cam ring 17 in this case is larger than that in the wide-angle state and is smaller than that in the retracted state. This applies to Embodiment 2 later described.

The foregoing is realized because the position of the second barrel 19 (second lens unit 18) is determined by the cam groove portions 15d and 17d, while the position of the first barrel 8 is determined by the cam groove portion 15e. In other words, the third moving cam ring 17 is moved by the first moving cam ring 15 in the optical axis direction such that the second barrel 19 is driven alone in the optical axis direction relative to the first barrel 8 of which the position is determined by the cam groove portion 15e.

As described above, according to Embodiment 1, the moving stroke of the second barrel 19 can be increased as compared with the case in which the second barrel 19 is driven only by any cam formed in the first moving cam ring 15. This is because the moving stroke of the second barrel 19 in the optical axis direction is determined by the sum of the cam groove portion 15d and the cam groove portion 17b.

For this reason, the first moving cam ring 15 and the third moving cam ring 17 can be formed of members having lengths significantly shorter than the moving stroke of the second barrel 19. It is possible to reduce the size when the lens barrel is collapsed and to realize a higher magnification in the image-pickup optical system. In addition, the cam follower can be moved smoothly along the cam groove portions 15d and 17b to allow smooth zooming without being snagged.

The second barrel 19 includes a center alignment mechanism with the movable follower pin 34. This can avoid degradation in optical performance due to decentering of the second barrel 19. In addition, since all of the to-and-fro mechanisms of the barrels 8 and 19 are cam driving mechanisms capable of accurate driving in Embodiment 1, stable optical performance can be achieved.

Embodiment 2

Figure 10A:
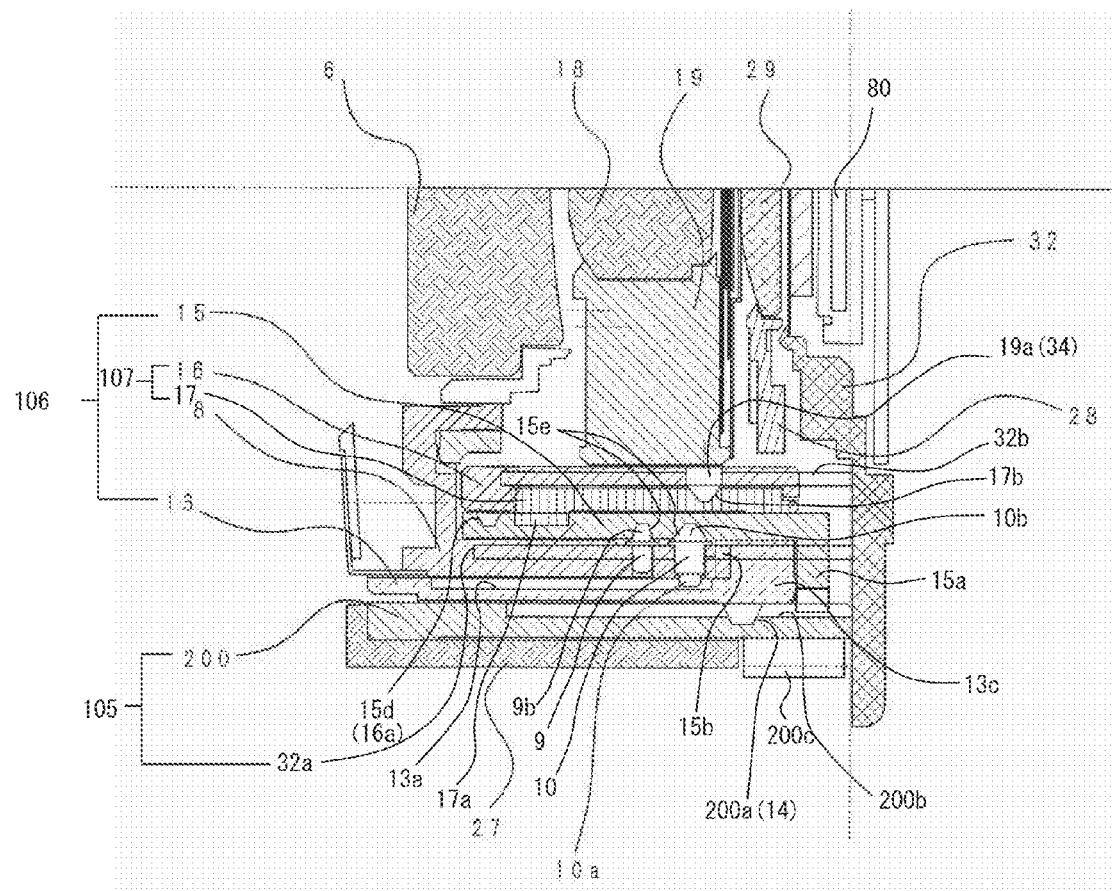
FIG. 10A is a section view showing a lens barrel which is Embodiment 2 of the present invention in a collapsed state.
Figure 10B:
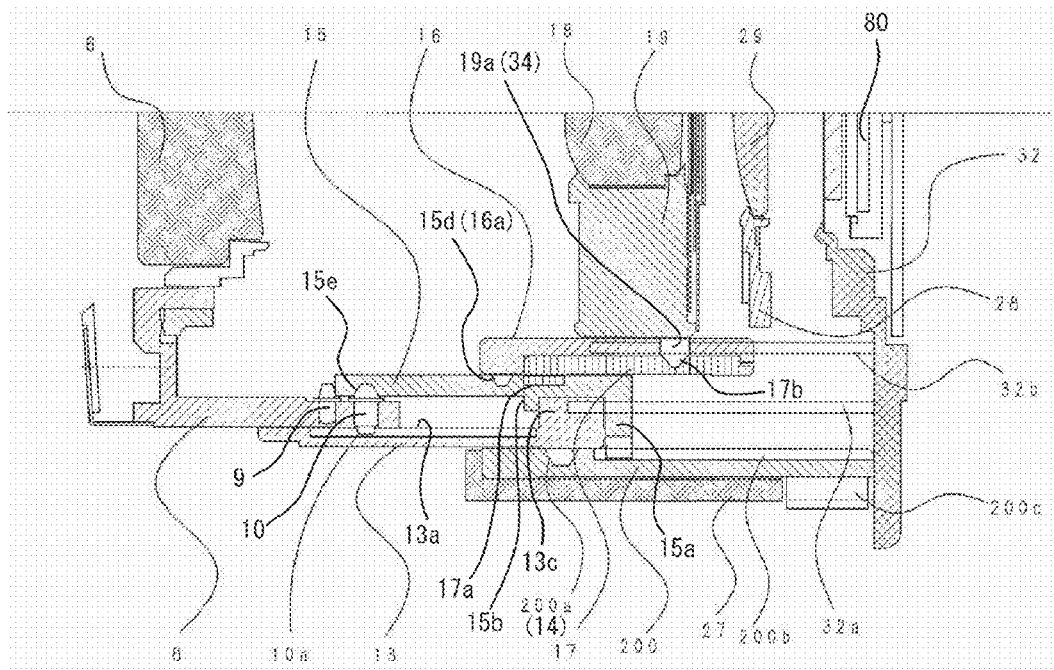
FIG. 10B is a section view showing the lens barrel of Embodiment 2 for a wide-angle state.
Figure 10C:
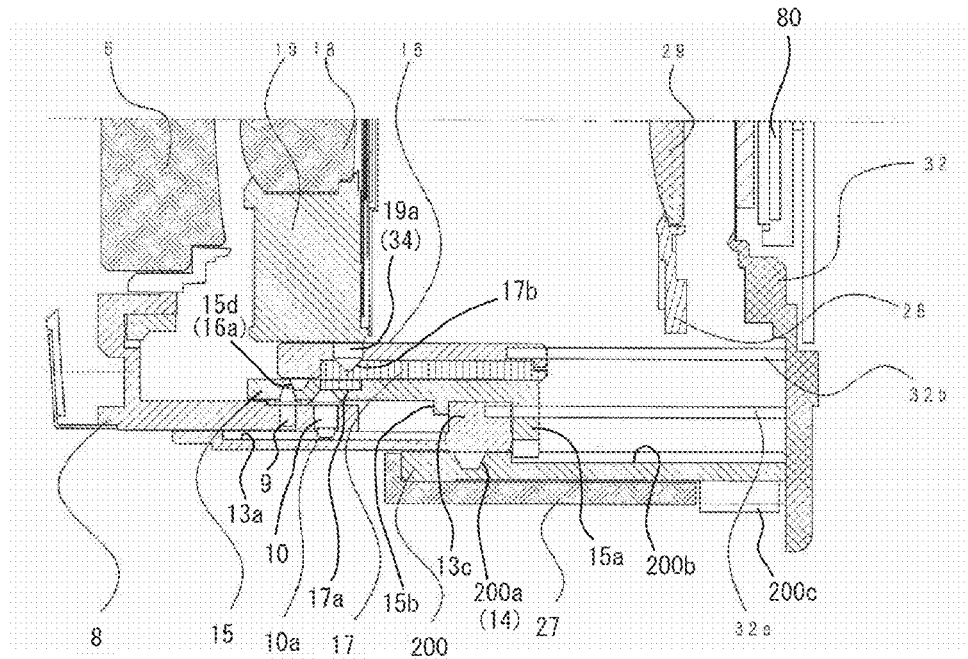
FIG. 10C is a section view showing the lens barrel of Embodiment 2 for a telephoto state.

FIGS. 10A, 10B, and 10C are section views showing a collapsed state, a wide-angle state, and a telephoto state of a two-stage collapsible (telescopic) lens barrel (lens apparatus) which is Embodiment 2 of the present invention, respectively. In Embodiment 2, members having the same functions as those in Embodiment 2 are designated with the same reference numerals. The lens barrel in Embodiment 2 is mounted on a camera similar to that shown in FIG. 12.

Reference numeral 32 shows a base member of the lens barrel. The base member 32 forms the body of the lens barrel together with a fixed barrel 27 secured to a front end portion of the base member 32 by screws. The base member 32 holds an image-pickup element 80 and a third barrel 28 which is driven by a focus motor in the direction of an optical axis, similarly to Embodiment 1. A third lens unit 29 serving as a focus lens is held on the third barrel 28.

A driving cam ring 200 is placed inside the fixed barrel 27. Gear teeth 200c are formed on the driving cam ring 200 and mesh with a zoom gear train, not shown.

A gear for input of the zoom gear train is connected to an output shaft of a zoom motor 41 (see FIG. 1). Thus, the driving force of the zoom motor 41 is transmitted to the driving cam ring 200.

A cam groove portion 200a is formed in the inner circumferential surface of the driving cam ring 200. A follower pin 14 pressed into a first straight advancing barrel 13 is engaged with the cam groove portion 200a.

Protrusions 15a and 15b similar to those in Embodiment 1 are formed on the outer circumferential surface of a first moving cam ring 15. A rib 13c formed on the inner circumferential surface of the first straight advancing barrel 13 is inserted between the protrusions 15a, 15b.

Since notches 13d (see FIG. 4) are formed in the rib 13c at the same angular positions as those of the protrusions 15b, similarly to Embodiment 1, the first moving cam ring (first driving member) 15 can be mounted to the first straight advancing barrel 13 from therebehind. The first straight advancing barrel 13 and the first moving cam ring 15 can be rotated at angular positions other than the angular position at which the ring 15 is mounted to the barrel 13, and they can be moved together in the optical axis direction.

Guide key portions 32a extending from the base member 32 are engaged with some of the notches 13d of the first straight advancing barrel 13 in the width direction (circumferential direction). As the driving cam ring 200 is rotated, the first straight advancing barrel 13 is not rotated relative to the base member 32 but driven in the optical axis direction. In this manner, the driving cam ring 200 and the guide key portion 32a constitute a first to-and-fro mechanism (driving mechanism) 105.

The end of the protrusion 15a of the first moving cam ring 15 is engaged with a key groove portion 200b formed in the inner circumferential surface of the driving cam ring 200 so as to extend in the optical axis direction, thereby transmitting the rotation force of the driving cam ring 200 to the first moving cam ring 15.

Cam groove portions 15e and 15d are formed in the outer and inner circumferential surfaces of the first moving cam ring 15, respectively. Tapered portions 10b, 9b of a follower pin 10 and a sub follower pin 9 pressed into the first barrel 8 for holding a first lens unit 6 are engaged with the cam groove portion (first cam portion) 15e in the outer circumferential surface of the first moving cam ring 15. Similarly to Embodiment 1, the shaft portion of the follower pin 10 is longer than the wall thickness of the first barrel 8, and after the follower pin 10 is pressed thereinto, a convex portion 10a protrudes from the outer circumferential surface of the first barrel 8.

The convex portion 10a is engaged with a key groove portion 13a formed in the inner circumferential surface of the first straight advancing barrel 13. Thus, the first barrel 8 is guided to move straight in the optical axis direction by the first straight advancing barrel 13.

As the driving cam ring 200 is rotated, the first moving cam ring 15 is rotated at the same time. Then, the first straight advancing barrel 13 is driven in the optical axis direction along the cam groove portion 15e formed in the outer circumferential surface of the first moving cam ring 15. Thereby, the first barrel 8 is driven in the optical axis direction. In this manner, the first moving cam ring 15 and the first straight advancing barrel 13 form a second to-and-fro mechanism 106.

As described above, the first barrel 8 is driven in the optical axis direction by the first and second to-and-fro mechanisms 105 and 106.

The cam groove portion (second cam portion) 15d is formed in the inner circumferential surface of the first moving cam ring 15. A cam follower portion 16a provided on the outer circumferential surface of the second straight advancing barrel 16 is engaged with the cam groove portion 15d. A third moving cam ring (second driving member) 17 is placed on the outer circumference of the second straight advancing barrel 16. The third moving cam ring 17 is rotatable around the optical axis relative to the second straight advancing barrel 16. With the structure similar to that in Embodiment 1, the third moving cam ring 17 is, however, moved together with the second straight advancing barrel 16 in the optical axis direction.

A straight guide key hole (not shown) is formed in the second straight advancing barrel 16. A guide key portion 32b extending in the optical axis direction from the base member 32 is engaged with the guide key hole. This allows the second straight advancing barrel 16 to be guided in the optical axis direction.

A second barrel 19 includes a mechanism for driving a second lens unit 18, aperture blades, not shown, and shutter blades, not shown. The second barrel 19 is provided on the outer circumference with two fixed cam followers 19a having tapered portions at their ends and a movable cam follower 34 biased outward in the diameter direction of the barrel by a compression spring 33 at regular intervals (see FIG. 3).

The cam followers 19a and 34 are engaged with a cam groove portion 17b formed in the inner circumferential surface of the third moving cam ring 17. These cam followers 19a and 34 are also engaged with a straight guide groove portion 16d (see FIG. 8A) formed so as to extend in the optical axis direction in the second straight advancing barrel 16. Thereby, as the third moving cam ring 17 is rotated, the second barrel 19 is moved in the optical axis direction along the cam groove portion 17b. At this time, the second barrel 19 is guided in the optical axis direction along the straight guide groove portion 16d in the second straight advancing barrel 16.

In this manner, the second barrel 19 is driven in the optical axis direction by a third to-and-fro mechanism 107 formed of the second straight advancing barrel 16 and the third moving cam ring 17.

The shapes of the third moving cam ring 17 and the second straight advancing barrel 16 in developed views in the circumferential direction in Embodiment 2 are identical to those in Embodiment 1 shown in FIGS. 7A to 7C.

In Embodiment 2, the third to-and-fro mechanism 107 for driving the second barrel 19 in the optical axis direction is provided so as to separate from the middle of a series of the first and second to-and-fro mechanisms 105 and 106 for driving the first barrel 8 in the optical axis direction.

FIGS. 10A and 8A show the state in which the power for the camera is turned off and the lens barrel is collapsed. When a main switch 102 is operated in this state to power the camera on, the zoom motor 41 is energized. The rotation force of the zoom motor 41 is transmitted to the driving cam ring 200 via a train of zoom gears 42 to 46 and is also transmitted to the first moving cam ring 15. The transmitted rotation force moves the first moving cam ring 15 rightward in FIG. 8A.

The cam follower portion 16a of the second straight advancing barrel 16 is engaged with the cam groove portion 15d formed in the first moving cam ring 15, and the second straight advancing barrel 16 is guided straight in the optical axis direction by the straight guide key 23. Thus, the second straight advancing barrel 16 is moved downward in FIG. 8A along the cam groove portion 15d.

Since a driving key 17a formed on the outer circumference of the third moving cam ring 17 is engaged with a key groove portion 15c of the first moving cam ring 15, the rotation force of the first moving cam ring 15 is transmitted to the third moving cam ring 17. The third moving cam ring 17 is moved in the optical axis direction together with the second straight advancing barrel 16 while rotating.

The fixed cam followers 19a provided for the second barrel 19 and the movable cam follower 34 biased outward in the diameter direction of the lens barrel as described above are engaged with the cam groove portion 17b formed in the third moving cam ring 17 and also engaged with the straight guide groove portion 16d of the second straight advancing barrel 16. Thereby, the second barrel 19 is driven in the rotation direction along the cam groove portion 17b of the third moving cam ring 17 while being guided straight in the optical axis direction.

In this manner, the state is changed to the wide-angle state shown in FIGS. 10B and 8B and the camera is ready for image pickup.

Next, when a zoom lever 107 is operated in the telephoto direction, the zoom motor 41 is energized for rotation in the telephoto direction. The rotation force from the zoom motor 41 is transmitted to the driving cam ring 200 via the train of zoom gears 42 to 46 and then transmitted to the first moving cam ring 15 and the third moving cam ring 17. In this manner, the first barrel 8 and the second barrel 19 are driven in the optical axis direction to change the zoom state to the telephoto state shown in FIGS. 10C and 8C.

The moving amount of the second barrel 19 alone in the optical axis direction in the change between the wide-angle state and the telephoto state corresponds to the sum of the lift amount between the wide-angle position and the telephoto position of the cam groove portion 15d formed in the first moving cam ring 15 and the lift amount between the wide-angle position and the telephoto position of the cam groove portion 17b formed in the third moving cam ring 17.

Specifically, as shown in FIG. 10B, in the wide-angle state, the third moving cam ring 17 can be moved widely toward the image plane relative to the first moving cam ring 15, and correspondingly, the second barrel 19 can be separated sufficiently from the first barrel 8 toward the image plane. In the telephoto state, as shown in FIG. 10C, the third moving cam ring 17 is moved to the position where the first moving cam ring 15 is generally overlapped with the third moving cam ring 17 in the direction orthogonal to the optical axis, and the second barrel 19 can be disposed close to the first barrel 8. This is realized because the third moving cam ring 17 which drives the second barrel 19 (second lens unit 18) independently in the optical axis direction is moved by the first moving cam ring 15 in the optical axis direction.

In this manner, according to Embodiment 2, the moving stroke of the second barrel 19 can be increased as compared with the case in which the second barrel 19 is driven only by any cam formed in the first moving cam ring 15. This is because the moving stroke of the second barrel 19 in the optical axis direction is determined by the sum of the cam groove portion 15d and the cam groove portion 17b.

For this reason, the first moving cam ring 15 and the third moving cam ring 17 can be formed of members having lengths significantly smaller than the moving stroke of the second barrel 19. It is possible to reduce the size of the lens barrel and realize a higher magnification in the image-pickup optical system. In addition, the cam follower can be moved smoothly along the cam groove portions 15d and 17b to allow smooth zooming without being snagged.

Further in Embodiment 2, the second barrel 19 includes a center alignment mechanism with the movable follower pin 34 similarly to Embodiment 1. This can avoid degradation in optical performance due to decentering of the second barrel 19. In addition, since all of the to-and-fro mechanisms of the barrels 8 and 19 are cam driving mechanisms capable of accurate driving in Embodiment 2, stable optical performance can be achieved.

Figure 11:
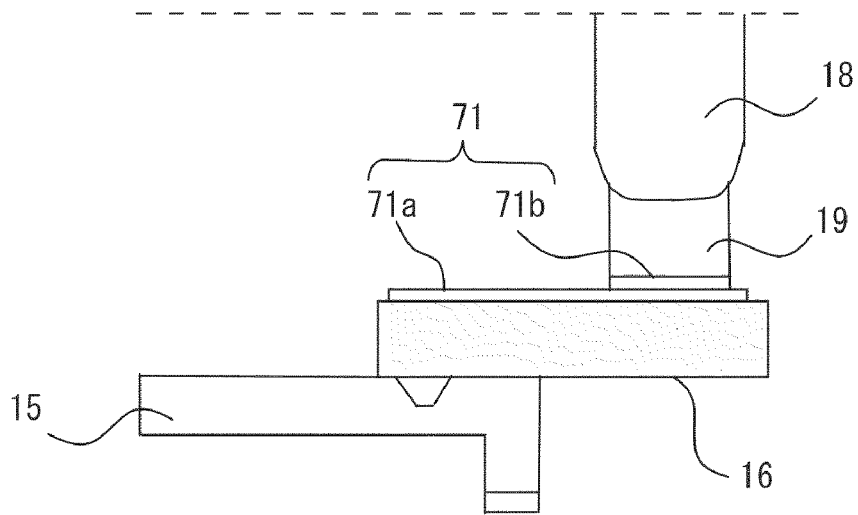
FIG. 11 is a section view showing a modification of Embodiments 1 and 2.

While Embodiments 1 and 2 have been described in conjunction with the driving of the second barrel 19 in the optical axis direction by the third moving cam ring 17, the driving mechanism for the second barrel (second lens) is not limited to such a cam mechanism in embodiments of the present invention. For example, as shown in FIG. 11, a to-and-fro mechanism may be provided by using a vibration-type linear actuator (second driving member) 71 formed of a vibrator 71b and an elastic body rail 71a which are provided between the second barrel 19 and the second straight advancing barrel 16. Alternatively, a to-and-fro mechanism may be provided by using a linear actuator of a voice coil type or an actuator formed of a motor including a lead screw and a rack.

Embodiments of the present invention include not only to the lens apparatus of the three-stage or two-stage telescopic type described in Embodiments 1 and 2, but also to a lens apparatus of a telescopic type of a single stage or four or more stages.

According to embodiments of the present invention, the lens apparatus can have a simple and small structure and have the moving stroke of the second lens equal to the sum of the moving stroke provided by the driving of the second driving member and the moving stroke provided by the driving of the second moving member by the first driving member. It is thus possible to realize the lens apparatus which achieves both of a reduced size and a higher magnification.

Furthermore, the present invention is not limited to these preferred embodiments and various variations and modifications may be made without departing from the scope of the present invention.

This application claims foreign priority benefits based on Japanese Patent Application No. 2006-042893, filed on Feb. 20, 2006, which is hereby incorporated by reference herein in its entirety as if fully set forth herein.

What is claimed is:

1. A lens apparatus that provides a variable magnification by moving a first lens and a second lens in an optical axis direction of an optical axis, the second lens being placed closer to an image plane than the first lens, the lens apparatus comprising:
    a first driving member that is rotated around the optical axis to move the first lens in the optical axis direction;
    a second driving member that moves the second lens in the optical axis direction; and
    a driving mechanism that at least drives the rotation of the first driving member,
    wherein the second driving member is moved in the optical axis direction relative to the first driving member by the rotation of the first driving member, and wherein the first driving member is configured to be moved in the optical axis direction.

2. The lens apparatus according to claim 1, wherein the first driving member includes a first cam portion that drives the first lens in the optical axis direction and a second cam portion that drives the second driving member in the optical axis direction, wherein the first cam portion and the second cam portion are formed on opposite surfaces of the first driving member.

3. The lens apparatus according to claim 2, further comprising:
    a straight advancing member that is movable in the optical axis direction together with the second driving member and allows rotation of the second driving member around the optical axis, wherein the first driving member drives the straight advancing member in the optical axis direction with the second cam portion, and the second driving member is driven to be rotated by the first driving member.

4. The lens apparatus according to claim 1, wherein the second driving member includes a cam portion that drives the second lens and is rotated around the optical axis.

5. An image-pickup apparatus, comprising:
    an image-pickup apparatus body; and
    the lens apparatus according to claim 1 provided for the image-pickup apparatus body.

6. A lens apparatus that is changed between a wide-angle state and a telephoto state by moving a first lens and a second lens in an optical axis direction of an optical axis, the second lens being placed closer to an image plane than the first lens, the lens apparatus comprising:
    a first driving member that is rotated around the optical axis to move a first holding member, which holds the first lens, in the optical axis direction; and
    a second driving member that is rotated around the optical axis to move a second holding member, which holds the second lens, in the optical axis direction, wherein the rotation of the first driving member around the optical axis rotates the second driving member around the optical axis, wherein the first lens is separated from the second lens in the wide-angle state more widely than in the telephoto state, and wherein the first driving member is configured to be moved in the optical axis direction.

7. An image-pickup apparatus, comprising:
    an image-pickup apparatus body; and
    the lens apparatus according to claim 6 provided for the image-pickup apparatus body.

8. A lens apparatus that is changed between a retracted state and an image picking-up state by moving a first lens and a second lens in an optical axis direction of an optical axis, the second lens being placed closer to an image plane than the first lens, the lens apparatus comprising:
    a first driving member that is rotated around the optical axis to move a first holding member, which holds the first lens, in the optical axis direction; and
    a second driving member that is rotated around the optical axis to move a second holding member, which holds the second lens, in the optical axis direction, wherein the rotation of the first driving member around the optical axis rotates the second driving member around the optical axis, and an overlap amount between the first driving member and the second driving member in a direction orthogonal to the optical axis in the image picking-up state is smaller than that in the retracted state, and wherein the first driving member is configured to be moved in the optical axis direction.

9. The lens apparatus according to claim 8, wherein the overlap amount between the first driving member and the second driving member in a wide-angle state of the image picking-up state is smaller than that in the retracted state and that in a telephoto state of the image picking-up state.

10. An image-pickup apparatus, comprising:
    an image-pickup apparatus body; and
    the lens apparatus according to claim 8 provided for the image-pickup apparatus body.

* * * * *